United States Patent
Lenchner et al.

(10) Patent No.: US 10,719,586 B2
(45) Date of Patent: Jul. 21, 2020

(54) ESTABLISHING INTELLECTUAL PROPERTY DATA OWNERSHIP USING IMMUTABLE LEDGERS

(71) Applicant: INTERNATIONAL BUSINESS MACHINES CORPORATION, Armonk, NY (US)

(72) Inventors: Jonathan Lenchner, North Salem, NY (US); Maharaj Mukherjee, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 114 days.

(21) Appl. No.: 15/730,950

(22) Filed: Oct. 12, 2017

(65) Prior Publication Data

US 2019/0114395 A1 Apr. 18, 2019

(51) Int. Cl.
| | |
|---|---|
| *H04L 29/06* | (2006.01) |
| *G06F 21/10* | (2013.01) |
| *G06Q 50/18* | (2012.01) |
| *H04L 9/06* | (2006.01) |
| *H04L 9/32* | (2006.01) |
| *G06F 21/64* | (2013.01) |
| *G06F 40/00* | (2020.01) |
| *G06F 21/62* | (2013.01) |
| *G06F 40/20* | (2020.01) |

(52) U.S. Cl.
CPC ............ *G06F 21/10* (2013.01); *G06F 21/64* (2013.01); *G06F 40/00* (2020.01); *G06Q 50/184* (2013.01); *H04L 9/0637* (2013.01); *H04L 9/3239* (2013.01); *G06F 21/6218* (2013.01); *G06F 40/20* (2020.01); *H04L 9/3247* (2013.01); *H04L 2209/38* (2013.01)

(58) Field of Classification Search
CPC ...... G06F 21/10; G06F 17/20; G06F 21/6218; G06F 40/00; G06F 21/64; G06F 40/20; G06Q 50/184; H04L 9/0637; H04L 9/3247; H04L 9/3239; H04L 2209/38
See application file for complete search history.

(56) References Cited

U.S. PATENT DOCUMENTS

| | | | |
|---|---|---|---|
| 7,764,771 B2 | 7/2010 | Goerg et al. | |
| 8,150,777 B1* | 4/2012 | Tadayon | G06Q 30/0201 705/30 |
| 9,252,962 B1 | 2/2016 | Valeti | |
| 2003/0046207 A1* | 3/2003 | Torre | G06Q 40/02 705/36 R |
| 2003/0149588 A1* | 8/2003 | Joao | G06Q 10/10 705/310 |

(Continued)

*Primary Examiner* — Ghodrat Jamshidi
(74) *Attorney, Agent, or Firm* — Griffiths & Seaton PLLC (57) ABSTRACT

Embodiments for determining ownership of intellectual property data by a processor. Various communications provided by one or more contributors relating to the intellectual property data are tracked using one or more immutable ledgers. The communications maintained in the one or more immutable ledgers may be analyzed to identify a degree of contribution by the one or more contributors to the intellectual property. A degree of ownership may be assigned to the intellectual property data for the one or more contributors according to the analyzed content.

18 Claims, 6 Drawing Sheets

(56) References Cited

U.S. PATENT DOCUMENTS

| | | | |
|---|---|---|---|
| 2005/0240428 A1* | 10/2005 | Gabrick | G06Q 10/10 705/310 |
| 2009/0006225 A1* | 1/2009 | Multerer | G06Q 10/087 705/30 |
| 2012/0323625 A1* | 12/2012 | Lee | G06Q 10/06 705/7.17 |
| 2014/0365254 A1* | 12/2014 | Giles | G06Q 10/10 705/7.13 |
| 2015/0278820 A1* | 10/2015 | Meadows | G06Q 20/40145 705/64 |
| 2016/0210710 A1* | 7/2016 | Glennon | G06Q 50/184 |
| 2017/0193619 A1* | 7/2017 | Rollins | G06Q 50/184 |
| 2018/0232828 A1* | 8/2018 | Joao | G06Q 10/10 |
| 2018/0285996 A1* | 10/2018 | Ma | G06Q 50/184 |

\* cited by examiner

ESTABLISHING INTELLECTUAL PROPERTY DATA OWNERSHIP USING IMMUTABLE LEDGERS

BACKGROUND OF THE INVENTION

Field of the Invention

The present invention relates in general to computing systems, and more particularly to, various embodiments for establishing intellectual property data ownership using one or more immutable ledgers by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between people and also for the development of new technology.

SUMMARY OF THE INVENTION

Various embodiments for determining ownership of intellectual property data by a processor, are provided. In one embodiment, by way of example only, a method for determining ownership of intellectual property data, again by a processor, is provided. Communications provided by one or more contributors relating to the intellectual property data are tracked using one or more immutable ledgers. The communications maintained in the one or more immutable ledgers may be analyzed to identify a degree of contribution by the one or more contributors to the intellectual property. A degree of ownership may be assigned to the intellectual property data for the one or more contributors according to the analyzed content.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Each year billions of dollars are expended to establish ownership rights of intellectual property such as, for example, patents, trademarks, copyrights, or even trade secrets. Companies and organizations seek to protect intellectual property for both defensive purposes as well as freedom of action in order to maintain an edge over competitors. However, many of these companies and organizations employ hundreds of employees that may work in a collaborative environment for developing intellectual property. Consider the following examples.

In many companies, people often work together in groups to brainstorm and generate ideas to develop intellectual property (which may be protected) such as, for example, a patent. These employees may be referred to as an "inventor" or content contributor and may be a person, or persons, who contribute to the content of the intellectual property (e.g., claims of a patentable application or patent). In some jurisdictions, an inventor may legally be a person with "intellectual domination" over the inventive process, and not merely one who assists in the inventions reduction to practice. Since inventorship relates to the claims in a patent application and the specific legal jurisdiction, knowing who an inventor may be for an invention may be difficult to identify. Additionally, inventorship of a patent application can change during the prosecution of a patent application as claims are deleted or amended.

Joint inventors or co-inventors may also exist when a patentable invention is the result of inventive work of more than one inventor. Joint inventors may exist even where one inventor contributed a majority of the work. Accordingly, identifying joint inventors or even co-inventors is extremely difficult to identify particularly as ideas and concepts change over time in the development of a final intellectual property idea, which a company or person may desire to protect. Simply stated, it is often difficult to establish who is an inventor of an idea after the fact.

In an additional example, some companies may form business and research alliances where the business and research alliances develop and share intellectual property (e.g., inventions, patent applications, patents) and other key ideas. Once the alliances terminate, end, or even break down, it is often difficult to establish how a given idea or intellectual property concept originated, who contributed important aspects to it, and which of the companies should have an ownership stake.

Accordingly, various embodiments described herein provide a solution that ensures and guarantees the originator and contributors to intellectual property data (e.g., an invention) are assigned and given the appropriate priority and credit for the originator and contributors' work while eliminating noncontributing persons that may claim or suggest ownership as an inventor to an idea or contribution to the intellectual property.

In one aspect, communications provided by one or more contributors relating to the intellectual property data may be tracked using one or more immutable ledgers. The communications maintained in the one or more immutable ledgers may be analyzed to identify a degree of contribution by the one or more contributors to the intellectual property. A degree of ownership may be assigned to the intellectual property data for the one or more contributors according to the analyzed content.

In an additional aspect, mechanisms of the illustrated embodiments track contributions to intellectual property data. Each tracked contribution of each content contributor (e.g., inventor or person providing an idea to the topic) may be maintained in a separate, immutable, ledger entry, using technology such as, for example, blockchain. Audio or video data of discussions (e.g., brainstorming sessions), meetings, webinars, broadcasts, telephone conversations, or other types of settings wherein audio or video may be captured may be transcribed and entered as immutable documents in the one or more immutable ledgers. An attribution of each contributor and the contributions provided by the contributor (e.g., "who said what") may be embedded in the transcription. The one or more immutable ledgers may maintain and provide a tracing of the provided content by a content contributor from the starting state of the intellectual property data (e.g., an initial brainstorming session) to a final state of the intellectual property data (e.g., a description or claims of an invention disclosure/patent application, trade secret, technical paper, etc.)

Following a completion of reaching the final state of the intellectual property data (e.g., the drafting of patent application claims, submission of a patent application, or successful achievement in receiving a patent), mechanisms of the illustrated embodiments may track back through the one or more immutable ledgers and employ natural language processing ("NLP") operations to estimate and assign credit or ownership to an originating or primary contributor to the intellectual property data (e.g., the first person to come up with ideas associated with an independent claim, any additional independent claims, and any dependent claims of a patent application).

In one aspect, a greater percentage of credit or "authorship" to the intellectual property data may be cognitively assigned to a first concept contributor (e.g., first person) that created, generated, or conceived an idea, concept, suggestion, or content that may become a significant portion to the intellectual property data such as, for example, a primary, independent claim of a patent application. Also, a lesser percentage (as compared to the greater percentage) of credit or "authorship" to the intellectual property data may be cognitively assigned to secondary independent claims or dependent claims to secondary concept contributor(s) (e.g., a second, third, . . . , or "nth" person, where n is positive integer or selected variable) who contributed to a portion of the intellectual property data (e.g., additional or dependent claims) or provided ideas, concepts, suggestions, or content that are associated with dependent claims.

The mechanisms of the illustrated embodiments track "inventorship" to intellectual property by measuring keywords, expressions, images and flowcharts that may be used in a final write-up of the intellectual property data (e.g., a patent application, patent disclosures, trade secret, and even authored papers).

In one aspect, the one or more immutable ledgers may be a blockchain ledger that may be used to track the lifecycle of documents, ideas, concepts, suggestions, or contents, so that even if the original idea, concept, suggestion, or content for intellectual property (e.g., an invention) was A, but it subsequently morphed into A', A", and so on, the creator of idea A may be assigned a substantial amount (e.g., greater than 50%) of the credit or ownership of the intellectual property.

In one aspect, one or more blockchains (e.g., one or more immutable ledgers) may be used for recording the history of transactions. The one or more blockchains may be in a distributed database that keeps a continuously growing list of data records. Each data record is protected against tampering and revisions. The one or more blockchains may be used with ledgers of transactions, where the record is enforced cryptographically. The one or more blockchains establishes trust, accountability and transparency. The one or more blockchain ledgers may contain cryptographically signed and mutually linked blocks of records that link each content contributor (e.g., inventor) with the documents, ideas, concepts, suggestions, or recommendations of intellectual property data that are contributed. The one or more blockchain ledgers effectively prevents the illegal manipulation or inaccurate claim of authorship or inventor ownership to the documents, ideas, concepts, suggestions, or recommendations of intellectual property data so as to guarantee to all participants (e.g., content contributors) the correctness of authorship or inventor ownership.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
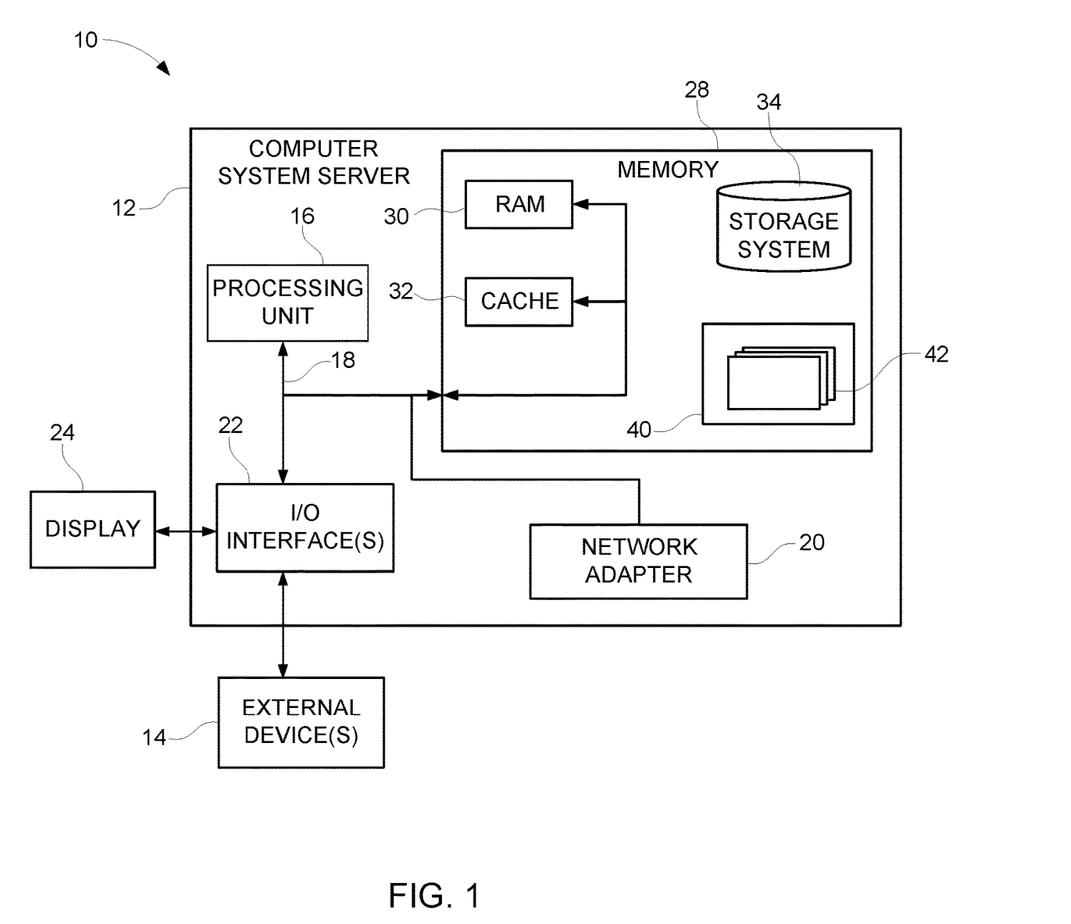
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
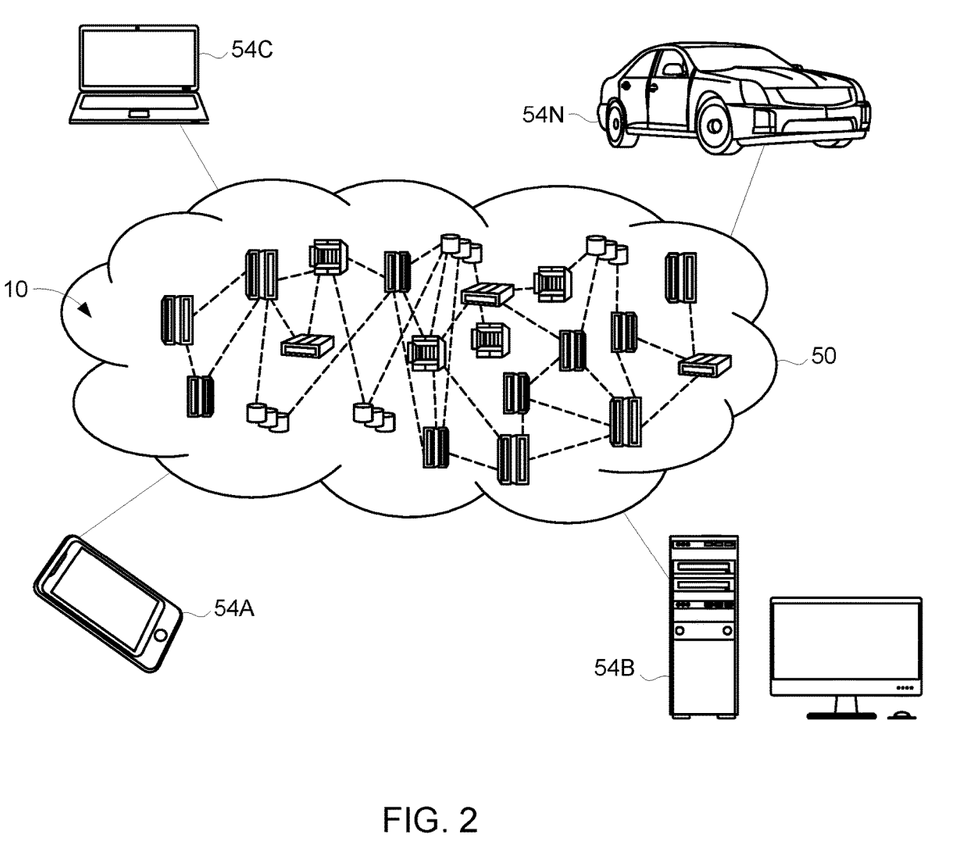
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
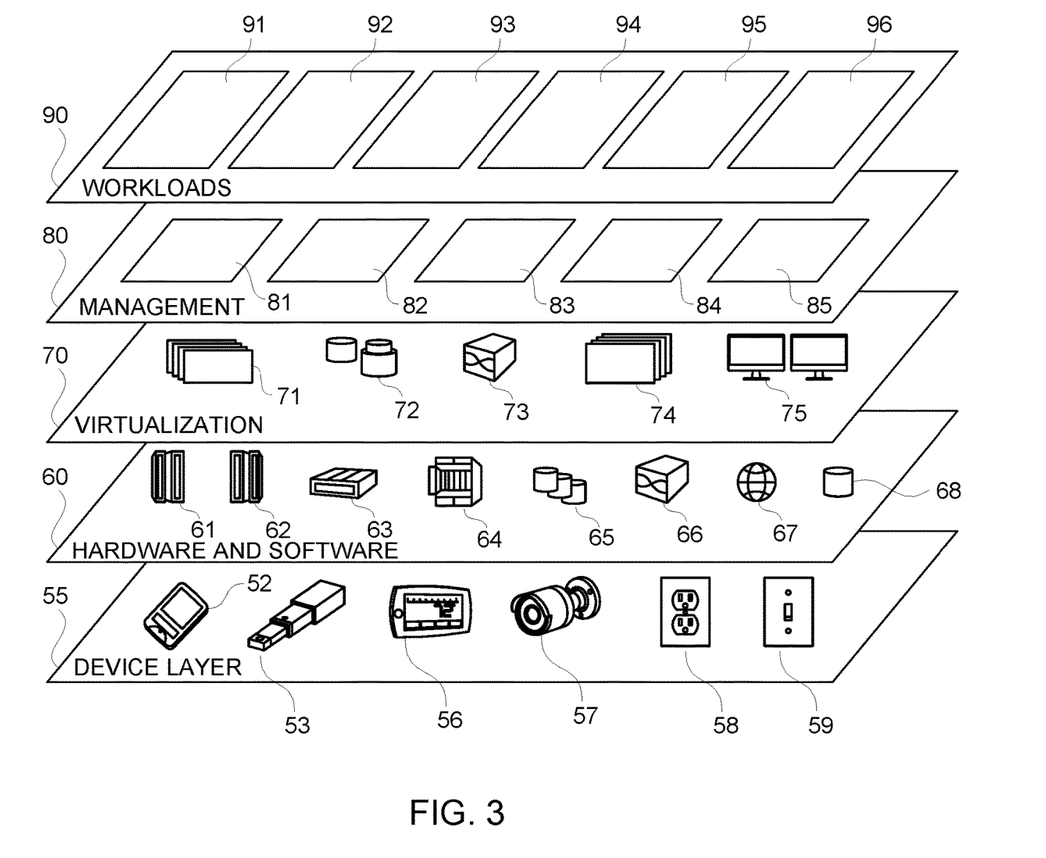
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intellectual property data ownership establishment workloads and functions 96. In addition, workloads and functions 96 may include such operations as data analytics, data analysis, and as will be further described, notification functionality. One of ordinary skill in the art will appreciate that the intellectual property data ownership establishment workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for establishing and determining ownership of intellectual property data. In one embodiment, communications provided by one or more contributors relating to the intellectual property data are tracked using one or more immutable ledgers. The communications maintained in the one or more immutable ledgers may be analyzed to identify a degree of contribution by the one or more contributors to the intellectual property. A degree of ownership may be assigned to the intellectual property data for the one or more contributors according to the analyzed content.

Figure 4:
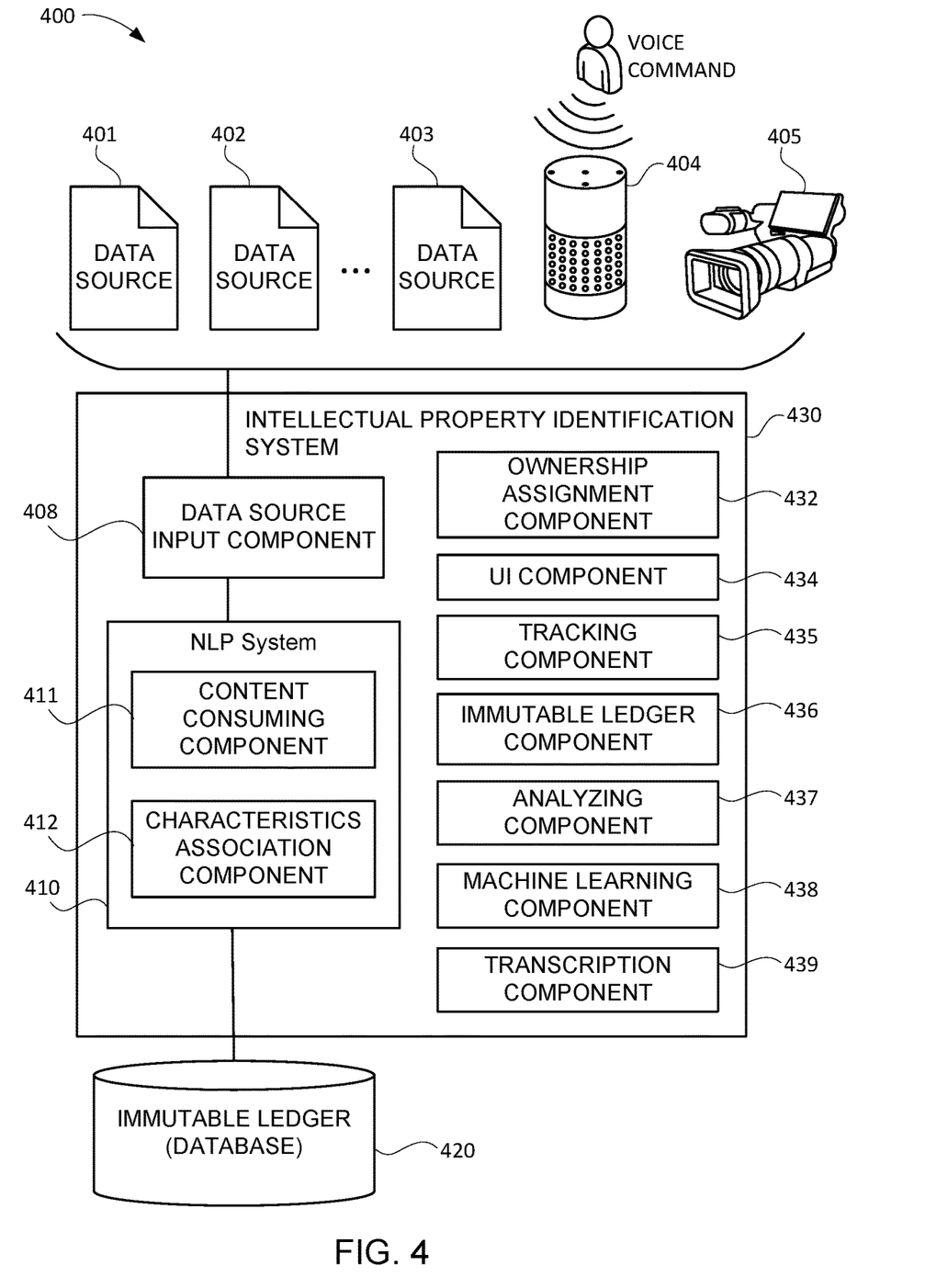
FIG. 4 is an additional block diagram depicting various user hardware and cloud computing components functioning in accordance with aspects of the present invention.

Turning now to FIG. 4, a block diagram of exemplary functionality 400 relating to establishing intellectual property data ownership is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for establishing intellectual property data ownership methods and features in accordance with the present invention, such as those described in FIGS. 1-3. Many of the functional blocks 400 may execute as background processes on various components, either in distributed computing components, or on the user device, or elsewhere.

Multiple data sources 401-405 may be provided by one or more content contributors (e.g., inventors, engineers, scientists, or persons developing intellectual property "ideas"). The data sources 401-405 may be provided as a corpus or group of data sources defined and/or identified. The data sources 401-405 may include, but are not limited to, data sources relating to one or more documents, materials related to emails, books, scientific papers, online journals, journals, articles, drafts, audio data, video data, and/or other various documents or data sources capable of being published, displayed, interpreted, transcribed, or reduced to text data. The data sources 401-405 may be all of the same type, for example, pages or articles in a wiki or pages of a blog. Alternatively, the data sources 401-405 may be of different types, such as word documents, wikis, web pages, power points, printable document format, or any document capable of being analyzed by a natural language processing system.

In addition to text based documents, other data sources such as audio, video or image sources may also be used wherein the audio, video or image sources may be pre-analyzed to extract or transcribe their content for natural language processing, such as converting from audio to text and/or image analysis. For example, a voice command issued by a content contributor may be detected by a voice-activated detection device 404 and record each voice command or communication. The recorded voice command/communication may then be transcribed into text data for natural language processing. As an additional example, a video capturing device 405 (e.g., a camera) may record a video such as, for example, a webinar or meeting where cameras are installed in a room for broadcasting the meeting to remote locations where various intellectual property content contributors may collaborate remotely. The video data captured by the video capturing device 405 may be analyzed and transcribed into images or text data for natural language processing.

The group of data sources 401-405 are consumed for an intellectual property data ownership identification system such as, for example, intellectual property identification system 430 using natural language processing (NLP) and artificial intelligence (AI) to provide processed content.

In one example, an instance of IBM® Watson® (IBM and Watson are trademarks of International Business Machines Corporation) NLP is used. The instance of Watson is provided and pointed at the group of data sources. The aspects of Watson that the described method and system makes use of are the technologies behind Alchemy Language (Alchemy Language is a trademark of International Business Machines Corporation). However, other NLP technologies or services may be used to provide the processed content as described herein.

The data sources 401-405 may be analyzed by an NLP system 410 (and a transcription component 439 if necessary) to data mine or transcribe relevant information from the content of the data sources 401-405 (e.g., intellectual property content contributions such as methods and features extracted from mined emails, reports, notes, scientific papers or documents) in order to display the information in a more usable manner and/or provide the information in a more searchable manner. The NLP system 410 may be an instance of an NLP and AI tool such as Watson, which may be provided as a cloud service or as a local service.

The NLP system 410 may consume the multiple data sources 401-405 as selected by using a data source input component 408, including, for example, word docs, emails, short message service ("SMS") messages, social media data (e.g., a post), academic or scientific papers, journals, books, online journals, wikis, web pages, power points, Internet word docs, knowledge centers, anything that the NLP system 410 knows how to understand. This may extend to non-text based documents, by providing pre-analyzing of the content such as audio or video to text processing.

The NLP system 410 may include a content consuming component 411 for inputting the data sources 401-405 and running its NLP and AI tools against them, learning the content, such as by using the machine learning component 438. The content consuming component 411 may also mine the content consumed. As the NLP system 410 (including the machine learning component 438) learns different sets of data, a characteristics association component 412 (or "cognitive characteristics association component") may use the artificial intelligence to make cognitive associations or links between data sources 401-405 by determining common concepts, methods, features, similar characteristics, and/or an underlying common topic. More specifically, the NLP system 410 may data mine the data sources 401-405 to identify and extract one or more entities or content contributors associated with concepts, methods, features, similar characteristics, and/or topics/subtopics via the characteristics association component 412.

Cognition is the mental process of knowing, including aspects such as awareness, perception, reasoning and judgment. An AI system uses artificial reasoning to interpret the data sources 401-405 and extract their topics, ideas, or concepts. The learned intellectual property concepts, suggestions, topics and subtopics of a domain of interest, may not be specifically named or mentioned in the data sources 401-405 and is derived by the AI interpretation.

The learned content of the data sources consumed by the NLP system may be merged into an immutable ledger 420 (or block change ledger that may be a structured database of processed data) or other data storage method of the consumed content with learned concepts, methods, and/or features of the data sources 401-405 providing association between the content referenced to the original data sources 401-405.

The immutable ledger 420 may also work in conjunction with an immutable ledger component 436 to maintain a timestamped record of all interactions and contributions of each content contributor to an intellectual property subject, topic, or idea. The immutable ledger component 436 may record and maintain in the immutable ledger 420 the evolution of ideas, subjects, topics, ideas, or content discussed in the data sources 401-405 in a forward-chaining direction to the intellectual property data's ultimate and final state or completeness (e.g., such as the intellectual property that may be described in claims of a patent application).

For example, the immutable ledger 420, using the immutable ledger component 436, may ensure each contribution of intellectual property content (e.g., ideas) that is provided by a content contributor associated with the intellectual property data (e.g., patent application, patent, trade secret, scientific paper, etc.) may be immutably tracked. In one aspect, the immutable ledger 420 offers the following advantages. The immutable ledger 420 may immutably capture when and by whom a contribution of intellectual property data (e.g., ideas) occurs. The immutable ledger 420 enables each intellectual property content contributor to be aware of and electronically attest (e.g., cryptographic strength) to the contribution, so that conflicts cannot later arise. The immutable ledger 420 maintains an electronic record that includes a "chain-of-custody" of all documents related to the intellectual property content.

The digital content of the original data sources 401-405 may remain in the original data sources such as the emails, electronic communications, papers, notes, reports, etc., but the immutable ledger 420 will have a logical understanding of how the original data sources 401-405 fit together using the power of the AI allowing for the concepts and therefore the associations or mappings between the data sources. In other words, the immutable ledger 420 may track, identify, and associate all communication threads of all intellectual property data generated during all stages of the development or "life cycle" of the intellectual property data.

The merging of the data into one immutable ledger 420 (or multiple immutable ledgers) allows the intellectual property identification system 430 to act like a search engine, but instead of keyword searches, it will use an AI method of making cognitive associations between the data sources using the deduced concepts.

The intellectual property identification system 430 may include a user interface ("UI") component 434 (e.g., an interactive graphical user interface "GUI") providing user interaction with the indexed content for mining and navigation and/or receiving one or more inputs/queries from a user such as, for example, a request from a user "Who are the inventors that need to sign documents for patent application "X"?" More specifically, the user interface component 434 may be in communication with a wireless communication device (e.g., computer, laptop, smart phone, tablet, and the like such as, for example, the personal digital assistant (PDA) or cellular telephone 54A, the desktop computer 54B, the laptop computer 54C, and/or the automobile computer system 54N of FIG. 2.) for also providing user interaction with the indexed content relating to intellectual property identification, evaluation, and ownership, which may be displayed in an enterprise social network graph. The wireless communication devices (e.g., the PDA or cellular telephone 54A, desktop computer 54B, laptop computer 54C, and/or automobile computer system 54N of FIG. 2) may also use the UI component 434 (e.g., GUI) for providing a domain-oriented query functionality such as, for example, interactive GUI functionality for enabling a user to enter a query in a GUI relating to a domain of interest and an associated objective.

The intellectual property identification system 430 may also include an ownership assignment component 432 (e.g., an enterprise social network graph or "Client Network"). The ownership assignment component 432 may use data retrieved directly from one or more data sources or stored in the immutable ledger 420 (or multiple immutable ledgers). The ownership assignment component 432 may assign or apportion a degree of ownership (e.g., assign credit for one or more contributions to intellectual property data) to the content contributors based on a plurality of contribution factors (e.g., an amount of contributed ideas, suggestions, or content, a magnitude of the contribution, the importance of the contribution, a degree of priority of the contribution, the directness or indirectness of the contribution, and connection of the content from a starting state to a final state of the intellectual property data). The ownership assignment component 432 may suggest the degrees of ownership credit and provide a tracing of the provided content by a content contributor from the starting state of the intellectual property data to a final state of the intellectual property data.

In one aspect, once the NLP system 410 has carried out the linking of the data, the ownership assignment component 432 may mine the associated concepts, topics, or similar characteristics from the immutable ledger 420 of the consumed content to assign a degree of ownership to each content contributor for intellectual property data.

The intellectual property identification system 430 may also include a tracking component 435 for monitoring, tracking, tracing, and/or identifying content contributions, connections, or relationships between the intellectual property data and a content contributor, which may be maintained in or displayed via the immutable ledger 420. The tracking component 435 may identify an individual entity that has contributed one or more suggestions to intellectual property. In one aspect, the tracking component 435 may track back from a final state of the intellectual property (e.g., claims or description of an intellectual property disclosure, report, paper, application, or patent) to the individual contributions of one or more content contributors (e.g., a group of engineers or inventors). The tracking component 435 may track the evolution of ideas, topics/subtopics, suggestions, or content that may be discussed in the documents or records of the immutable ledger 420 in a forward-chaining direction from the starting state of the intellectual property data to a final state of the intellectual property data (e.g., from the start of the inventing process such as, for example, in a brainstorming session to an ultimate reflection in claims of an intellectual property/invention disclosure or patent application or even trade secrets, academic/scientific papers, or other documents).

The intellectual property identification system 430 may also include an analyzing component 437 for determining and/or assigning credit or ownership for a content contributor to intellectual property data. The analyzing component 437 may work in conjunction with the ownership assignment component 432 for compiling a list of each content contributor to intellectual property data. The analyzing component 437 may assign a score, ranking, or credit such as, for example, a contribution score to the content contributed for each content contributor to intellectual property data. The contribution score may also be based upon a plurality of contribution factors. The analyzing component 437 may also assign the contribution score or credit for content associated with intellectual property associated with, for example, trade secrets, academic/scientific papers, or other documents.

A transcription component 439 may also be included in the intellectual property identification system 430. For example, the transcription component 439 may be used to transcribe audio data or image/video data from data sources 404 or 405. For example, a voice command/communication captured by the voice-activated detection device 404 may be transcribed by the transcription component 439 into text data for natural language processing. As an additional example, the video data captured by the video capturing device 405 may be analyzed and transcribed by the transcription component 439 into text data for natural language processing.

In one aspect, the analyzing component 437 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The intellectual property identification system 430 may also include a machine learning component 438. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
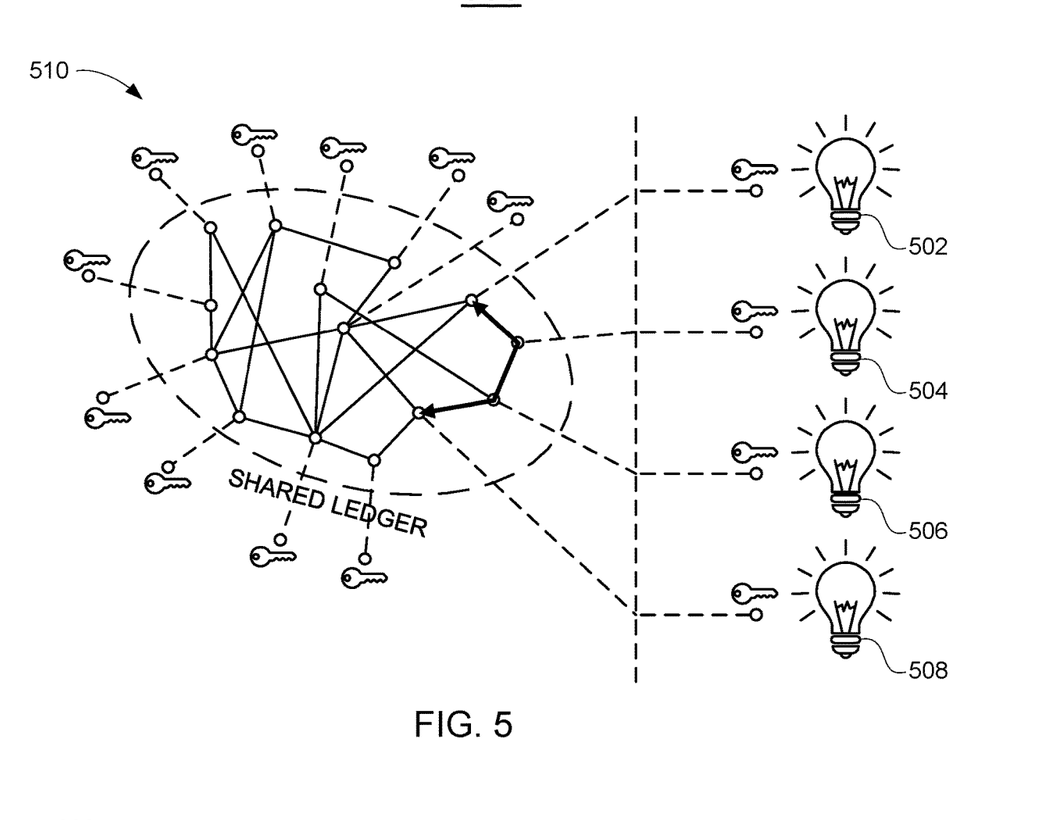
FIG. 5 is a graph diagram depicting an immutable ledger in which aspects of the present invention may be realized.

In view of the method 400 of FIG. 4, FIG. 5 depicts a graph diagram of an immutable ledger system 500. The immutable ledger system 500 may be implemented in hardware and/or software, such as by the computer/server 12 (FIG. 1), the workloads layer 90 (FIG. 3), and/or the immutable ledger of FIG. 4.

In one aspect, the immutable ledger system 500 includes an immutable ledger 510 having one or more ideas, concepts, suggestions, or content that may be included in the immutable ledger 510 (e.g., a blockchain). The idea, concept, suggestion, or content may be represented as an idea in FIG. 5, such as ideas 502, 504, 506, and 508. Each idea, concept, suggestion, or content may be identified by contexts and keywords and expressions or graphical images to describe those ideas. Each idea, such as ideas 502, 504, 506, and 508 may grow organically as new contexts or keywords are added. Each idea, such as ideas 502, 504, 506, and 508 may be refined as contexts or keywords are deleted. Any exchange of ideas, such as ideas 502, 504, 506, and 508 may be in the form of conversations, emails, short message service ("SMS") messages, documents, social media data (e.g., a post), academic or scientific papers, journals, books, online journals, wikis, web pages, power points, or any other means of exchange between two or more content contributors (e.g., inventors) of the intellectual property data (e.g., an invention). Each idea, such as ideas 502, 504, 506, and 508 may be considered as transactions that may be recorded in the immutable ledger 510 (e.g., "shared ledger" or "blockchain"). As ideas 502, 504, 506, and 508 are exchanged, the blockchain may maintain, track and keep tabs on how or when a new idea was created and how other ideas are added to it in the form of transactions.

In view of the foregoing, a blockchain open ledger(s) (e.g., immutable ledger) may be used to ensure the tracking, maintaining, storing, identifying, and encrypting of each contribution of ideas by a person associated with the intellectual property (e.g., invention, trade secret, paper, etc.). Each contribution of ideas by a person may be immutably tracked. The blockchain may immutably capture when and by whom a contribution of ideas happens or occurs (e.g., who said what about what). Using the blockchain enables all persons to be aware of, and electronically attest (at so-called cryptographic strength) to, the contribution to the intellectual property so that conflicts cannot later arise and are eliminated. The blockchain may keep and maintain an electronic "chain-of-custody" of all documents related to the intellectual property (e.g., invention, trade secret, paper, etc.).

In the event of audio or video data, the present invention may employ a transcription service to transcribe spoken conversations such as, for example, teleconferences or video conference calls, and attributes who said what during the conversation. In an additional aspect, a back-tracker operation (e.g., back-track the claims operations) may be used to identify and take words and expressions appearing in a final state (e.g., claims of a patent application) and work backwards to find and identify one or more versions of documents in the immutable ledger where the same or similar words and expressions were first used. The present invention may also track back to words, expressions and figures, or possibly similar figures, to find first mentions of the ideas so as to identify each contributor to the idea(s).

A forward-chaining idea tracker operation may be executed by performing a topic analysis of the documents associated with the intellectual property (e.g., patent application) and tracking the evolution of those topics or ideas. A directed graph may then be created that leads to the topics found associated with the final state of the intellectual property (e.g., claims or other parts of the final, formal document(s) associated with the invention, trade secret, etc.)

An idea-ownership credit scoring operation may also be executed to take the output of both back-tracker operation and the forward-chaining idea tracker operation and assign different amounts of idea ownership credit, based either on (i) priority in mentioning words, expressions or figures that were used (or close to those used) in the most important aspects of the formal document(s), or (ii) priority in having articulated ideas that had a seed effect in leading to the ideas of most importance in the formal document(s).

Figure 6:
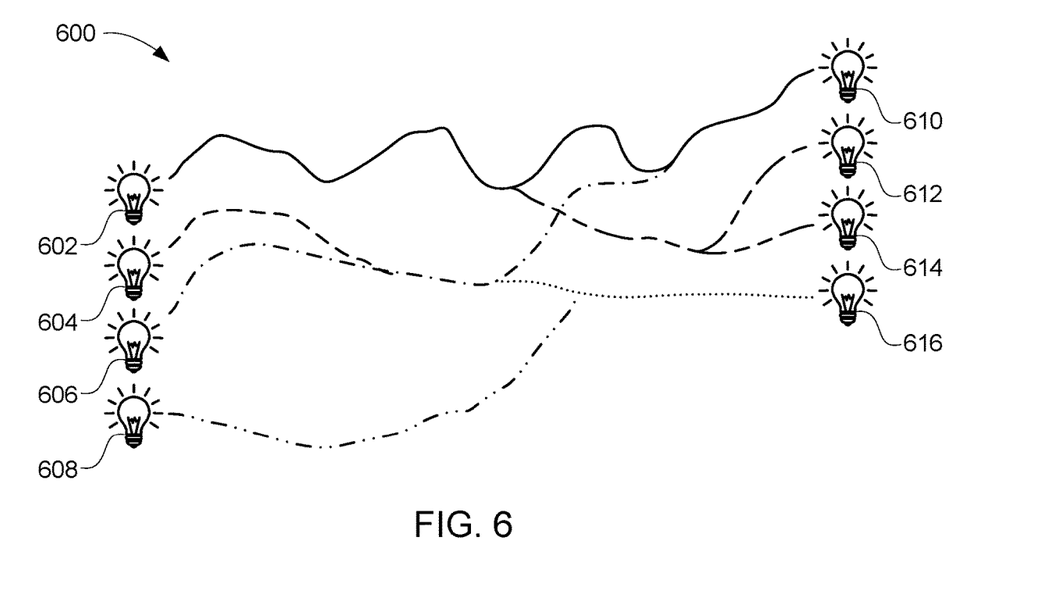
FIG. 6 is a graph diagram depicting the tracing of intellectual property communication suggestions from a starting state to a completed state in accordance with aspects of the present invention.

Turning now to FIG. 6, diagram 600 depicts the tracing of each idea (e.g., intellectual property communication suggestions) from a starting state to a completed state using one or more immutable ledgers (see FIG. 5). In one embodiment, by way of example only, one or more immutable ledgers (e.g., "blockchains") may track each of the threads (e.g., communications) of all ideas such as, for example, ideas 602-616 generated during the idea's entire life cycle. In one aspect, one or more threads (e.g., threads of ideas) may merge to create a single idea. In other aspects, the threads may separate to create different ideas. As illustrated, each time an idea becomes an independent thread, a separate chain is used. For example, idea 602 and idea 606 may be combined to form idea 610. Idea 602 may be combined with idea 606 to form two additional ideas such as, for example, ideas 612 and 614. As an additional example, ideas 604, 606, and 608 may be combined to form idea 616.

Any content contributor who has created an idea may be tracked and identified as a content contributor (e.g., an "inventor") to a particular intellectual property (e.g., an invention). Furthermore, one or more immutable ledgers enable identifying each person who participated in emails, short message service ("SMS") messages, documents, social media data (e.g., a post), academic or scientific papers, journals, books, online journals, wikis, web pages, power points, or any other means of exchange between two or more content contributors (e.g., inventors) of the intellectual property data (e.g., an invention). Accordingly, the one or more immutable ledgers enable the identification of both persons that did and persons that did not contribute to the generation of ideas, suggestions, or concepts. The identified, non-contributor may be automatically identified as a non-inventor or not an author of all or portions of the intellectual property. The immutable legers ensure that participants are aware of inventorship and authorship to each idea, suggestion, recommendation, or even input throughout the content creation process (e.g., a starting state culminating in a final state of intellectual property).

Communications provided by one or more contributors relating to the intellectual property data are tracked using one or more immutable ledgers. The communications maintained in the one or more immutable ledgers may be analyzed to identify a degree of contribution by the one or more contributors to the intellectual property. A degree of ownership may be assigned to the intellectual property data for the one or more contributors according to the analyzed content.

Figure 7:
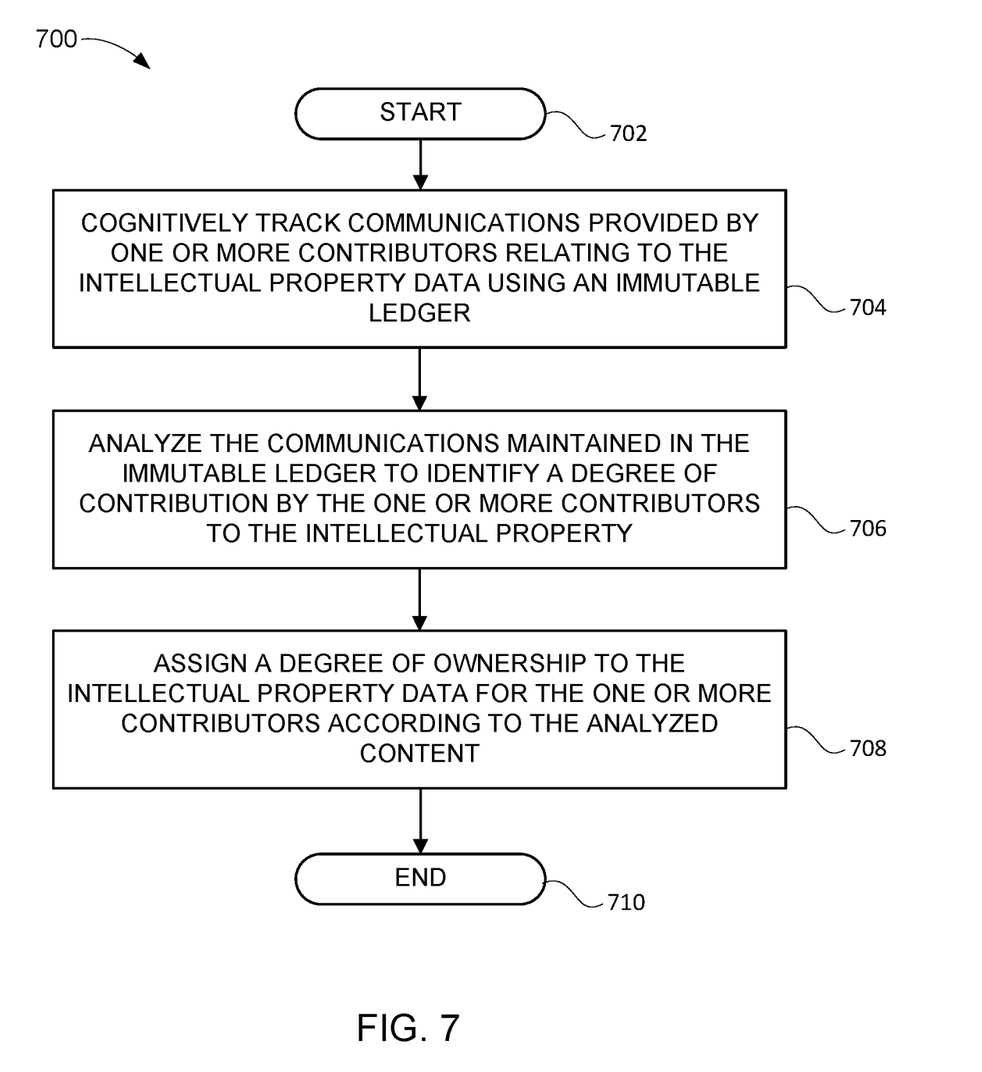
FIG. 7 is a flowchart diagram of an exemplary method for establishing intellectual property data ownership by a processor, in which various aspects of the present invention may be realized.

FIG. 7 is a method 700 for establishing intellectual property data ownership by a processor, in which various aspects of the illustrated embodiments may be implemented. The functionality 700 may be implemented as a method executed as instructions on a machine, where the instructions are included on at least one computer readable storage medium or one non-transitory machine-readable storage medium. The functionality 700 may start in block 702. Various communications (e.g., text data, audio data, video data from one or more types of data sources) provided by one or more contributors relating to the intellectual property data may be tracked using an immutable ledger (or multiple immutable ledgers), as in block 704. The communications maintained in the one or more immutable ledgers may be analyzed to identify a degree of contribution by the one or more contributors to the intellectual property, as in block 706. A degree of ownership may be assigned to the intellectual property data for the one or more contributors according to the analyzed content, as in block 708. The functionality 700 may end in block 710.

In one aspect, in conjunction with and/or as part of at least one block of FIG. 7, the operations of method 700 may include each of the following. The operations of method 700 may include tracking each stage of development of the intellectual property data according to the communications such that the tracking identifies each contribution by the one or more contributors. Various records of the communication between the one or more contributors may be maintained in one or more immutable ledgers using technologies such as, for example, one or more blockchain ledgers. In one aspect, tracking the communications further includes analyzing audio data or video data such that the analyzing includes transcribing the audio data or the video data to text data to create a record in the one or more immutable ledgers. The communications of the one or more immutable ledgers (e.g., each record in one or more immutable ledgers) may be processed using natural language processing (NLP).

The operations of method 700 may include identifying one or more primary contributions to the intellectual property data provided by one of the one or more contributors using the one or more immutable ledgers, wherein the one or more immutable ledgers may be one or more blockchain ledgers, identifying one or more secondary contributions to the intellectual property data provided by an alternative one of the one or more contributors, or a combination thereof. The operations of method 700 may include assigning the degree of ownership to the intellectual property data for the one or more contributors according to a plurality of contribution factors.

Thus, in summary, the present invention provides for assigning idea ownership credit for intellectual property (e.g., an invention disclosure, patent application, patent, etc.). One or more immutable ledgers may be used that keep, track, and maintain a timestamped record of all interactions and contributions of a group of content contributors (e.g., an inventing group). A tracking operation may be performed for tracking back from a final state of the intellectual property (e.g., claims of a patent application) to a starting state of the intellectual property (e.g., each individual contribution of the inventing group). Credit, ownership, or authorship may be assigned or apportioned based on a magnitude, priority or directness of the contribution and connection with the most important aspects of the intellectual property (e.g., independent claims). The evolution of ideas and topics as each grows and develops that have been discussed may be tracked in the documents of the ledger in a forward-chaining direction to the ideas ultimate reflection in the final state of the intellectual property (e.g., claims of a patent application).

Credit may be assigned and associated with a trade secret, published paper, or other documentation. In one aspect, selected portions or important portions of the trade secret or published paper may also be assigned credit as ownership to the user. Also, one or more degrees of idea ownership may be identified to assign all or partial credit to a content contributor. Each content contribution to the intellectual property may be traced, monitored, authenticated, and validated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer implemented method for determining ownership of intellectual property data by a processor, comprising:
tracking communications provided by one or more contributors relating to the intellectual property data using one or more immutable ledgers;
analyzing content of the communications maintained in the one or more immutable ledgers to identify a degree of contribution by the one or more contributors to the intellectual property data; wherein the tracking includes tracking audio data or video data such that analyzing the content includes transcribing the audio data or the video data to text data to create a record in the one or more immutable ledgers, the transcription including embedded attribution information as to whom of the one or more contributors contributed what portions of the intellectual property data during the communications;

commensurate with analyzing the transcription, performing a back-tracking operation on identified expressions appearing in a final state within the content; wherein the back-tracking operation recursively analyzes the communications in the one or more immutable ledgers to identify those of the communications where the identified expressions were first used to determine which of the one or more contributors first contributed the content associated with each of the identified expressions; and assigning a degree of ownership to the intellectual property data for the one or more contributors according to the analyzed content.

2. The method of claim 1, further including tracking each stage of development of the intellectual property data according to the communications such that the tracking identifies each contribution by the one or more contributors.

3. The method of claim 1, further including maintaining records of the communication between the one or more contributors.

4. The method of claim 1, further including processing the communications of the one or more immutable ledgers using natural language processing (NLP).

5. The method of claim 1, further including:
identifying one or more primary contributions to the intellectual property data provided by one of the one or more contributors using the one or more immutable ledgers, wherein the one or more immutable ledgers is a blockchain ledger; or
identifying one or more secondary contributions to the intellectual property data provided by an alternative one of the one or more contributors.

6. The method of claim 1, further including assigning the degree of ownership to the intellectual property data for the one or more contributors according to a plurality of contribution factors.

7. A system for determining ownership of intellectual property data, comprising:
one or more computers with executable instructions that when executed cause the system to:
cognitively track communications provided by one or more contributors relating to the intellectual property data using one or more immutable ledgers;
analyze content of the communications maintained in the one or more immutable ledgers to identify a degree of contribution by the one or more contributors to the intellectual property data; wherein the tracking includes tracking audio data or video data such that analyzing the content includes transcribing the audio data or the video data to text data to create a record in the one or more immutable ledgers, the transcription including embedded attribution information as to whom of the one or more contributors contributed what portions of the intellectual property data during the communications;
commensurate with analyzing the transcription, perform a back-tracking operation on identified expressions appearing in a final state within the content: wherein the back-tracking operation recursively analyzes the communications in the one or more immutable ledgers to identify those of the communications where the identified expressions were first used such as to determine which of the one or more contributors first contributed the content associated with each of the identified expressions: and
assign a degree of ownership to the intellectual property data for the one or more contributors according to the analyzed content.

8. The system of claim 7, wherein the executable instructions track each stage of development of the intellectual property data according to the communications such that the tracking identifies each contribution by the one or more contributors.

9. The system of claim 7, wherein the executable instructions maintain records of the communication between the one or more contributors.

10. The system of claim 7, wherein the executable instructions process the communications of the one or more immutable ledgers using natural language processing (NLP).

11. The system of claim 7, wherein the executable instructions:
identify one or more primary contributions to the intellectual property data provided by one of the one or more contributors using the one or more immutable ledgers, wherein the one or more immutable ledgers is a blockchain ledger; or
identify one or more secondary contributions to the intellectual property data provided by an alternative one of the one or more contributors.

12. The system of claim 7, wherein the executable instructions assign the degree of ownership to the intellectual property data for the one or more contributors according to a plurality of contribution factors.

13. A computer program product for determining ownership of intellectual property data by a processor, the computer program product comprising a non-transitory computer-readable storage medium having computer-readable program code portions stored therein, the computer-readable program code portions comprising:
an executable portion that tracks communications provided by one or more contributors relating to the intellectual property data using one or more immutable ledgers;
an executable portion that analyzes content of the communications maintained in the one or more immutable ledgers to identify a degree of contribution by the one or more contributors to the intellectual property data; wherein the tracking includes tracking audio data or video data such that analyzing the content includes transcribing the audio data or the video data to text data to create a record in the one or more immutable ledgers, the transcription including embedded attribution information as to whom of the one or more contributors contributed what portions of the intellectual property data during the communications;
an executable portion that commensurate with analyzing the transcription, performs a back-tracking operation on identified expressions appearing in a final state within the content; wherein the back-tracking operation recursively analyzes the communications in the one or more immutable ledgers to identify those of the communications where the identified expressions were first used to determine which of the one or more contributors first contributed the content associated with each of the identified expressions: and
an executable portion that assigns a degree of ownership to the intellectual property data for the one or more contributors according to the analyzed content.

14. The computer program product of claim 13, further including an executable portion that tracks each stage of development of the intellectual property data according to the communications such that the tracking identifies each contribution by the one or more contributors.

15. The computer program product of claim 13, further including an executable portion that maintains records of the communication between the one or more contributors.

16. The computer program product of claim 13, further including an executable portion that processes the communications of the one or more immutable ledgers using natural language processing (NLP).

17. The computer program product of claim 13, further including an executable portion that:
- identifies one or more primary contributions to the intellectual property data provided by one of the one or more contributors using the one or more immutable ledgers, wherein the one or more immutable ledgers are a blockchain ledger; or
- identifies one or more secondary contributions to the intellectual property data provided by an alternative one of the one or more contributors.

18. The computer program product of claim 13, further including an executable portion that assigns the degree of ownership to the intellectual property data for the one or more contributors according to a plurality of contribution factors.

\* \* \* \* \*